(12) United States Patent
Shigeta

(10) Patent No.: US 10,744,794 B2
(45) Date of Patent: Aug. 18, 2020

(54) INKJET PRINTING-LAMINATION INLINE SYSTEM AND METHOD

(71) Applicant: THINK LABORATORY CO., LTD, Chiba (JP)

(72) Inventor: Tatsuo Shigeta, Chiba (JP)

(73) Assignee: THINK LABORATORY CO., LTD., Chiba (JP)

( * ) Notice: Subject to any disclaimer, the term of this patent is extended or adjusted under 35 U.S.C. 154(b) by 0 days.

(21) Appl. No.: 16/085,190

(22) PCT Filed: Mar. 28, 2017

(86) PCT No.: PCT/JP2017/012531
§ 371 (c)(1),
(2) Date: Sep. 14, 2018

(87) PCT Pub. No.: WO2017/175621
PCT Pub. Date: Oct. 12, 2017

(65) Prior Publication Data
US 2019/0084321 A1  Mar. 21, 2019

(30) Foreign Application Priority Data

Apr. 7, 2016  (JP) .................................. 2016-077553

(51) Int. Cl.
*B41J 29/38* (2006.01)
*B41J 11/00* (2006.01)
(Continued)

(52) U.S. Cl.
CPC ........... *B41J 11/0015* (2013.01); *B29C 65/48* (2013.01); *B32B 37/0053* (2013.01);
(Continued)

(58) Field of Classification Search
USPC .......................................... 347/102; 156/281
See application file for complete search history.

(56) References Cited

U.S. PATENT DOCUMENTS 3,130,113 A * 4/1964 Silman .................... B32B 27/00
428/196
5,896,154 A * 4/1999 Mitani ................... B41J 2/1404
347/102

(Continued)

FOREIGN PATENT DOCUMENTS

CN 1452548 A 10/2003
CN 102114730 A 7/2011
(Continued)

*Primary Examiner* — Lam S Nguyen
(74) *Attorney, Agent, or Firm* — McGlew and Tuttle, P.C.

(57) ABSTRACT

Provided is a printing-lamination inline system and method being suitable for manufacturing packages having various kinds of package designs in small quantity and being capable of performing inkjet printing and lamination in an inline manner. The printing-lamination inline system comprises: a first web-shaped base material supply unit configured to supply a first web-shaped base material; an inkjet printer of a single-pass system, which is configured to subject the first web-shaped base material to aqueous inkjet printing; an adhesive application unit configured to apply an adhesive to the first web-shaped base material subjected to the aqueous inkjet printing; a second web-shaped base material supply unit configured to supply a second web-shaped base material so that the second web-shaped base material is bonded to the first web-shaped base material; a lamination unit configured to subject the first web-shaped base material and the second web-shaped base material to lamination; and an aging box configured to cause aging of a laminate film obtained by the lamination.

12 Claims, 5 Drawing Sheets

(51) Int. Cl.

| | |
|---|---|
| *B29C 65/48* | (2006.01) |
| *B41J 2/01* | (2006.01) |
| *B32B 38/00* | (2006.01) |
| *B32B 37/12* | (2006.01) |
| *B41J 15/18* | (2006.01) |
| *B41M 7/00* | (2006.01) |
| *B32B 37/00* | (2006.01) |
| *B41J 3/54* | (2006.01) |
| *B41M 5/00* | (2006.01) |

(52) U.S. Cl.
CPC ........ *B32B 37/1284* (2013.01); *B32B 38/145* (2013.01); *B41J 2/01* (2013.01); *B41J 3/546* (2013.01); *B41J 11/002* (2013.01); *B41J 15/18* (2013.01); *B41M 5/0017* (2013.01); *B41M 7/0027* (2013.01); *B32B 2037/1215* (2013.01); *B41M 5/0011* (2013.01); *B41M 5/0047* (2013.01); *B41M 5/0064* (2013.01)

(56) References Cited

U.S. PATENT DOCUMENTS

| | | | |
|---|---|---|---|
| 5,989,381 A * | 11/1999 | Murakami | ............... B32B 7/12 156/281 |
| 8,096,719 B1 | 1/2012 | Bailey et al. | |
| 2002/0122087 A1 | 9/2002 | Ishikawa et al. | |
| 2006/0203026 A1 | 9/2006 | Inoue | |
| 2010/0149231 A1 | 6/2010 | Mori et al. | |
| 2011/0063359 A1 | 3/2011 | Buchar et al. | |
| 2011/0267393 A1* | 11/2011 | Okamoto | ............... B41J 11/002 347/14 |
| 2015/0029255 A1 | 1/2015 | Ohnishi | |
| 2015/0112293 A1 | 4/2015 | Gust et al. | |
| 2015/0174924 A1 | 6/2015 | Fuchioka et al. | |
| 2016/0075148 A1 | 3/2016 | Nakano | |

FOREIGN PATENT DOCUMENTS

| | | |
|---|---|---|
| CN | 202071500 U | 12/2011 |
| DE | 3315139 A1 | 11/1983 |
| EP | 960739 A2 | 12/1999 |
| EP | 1287982 A1 | 3/2003 |
| EP | 2 329 954 A1 | 6/2011 |
| EP | 2 644 391 A1 | 10/2013 |
| JP | S58-224778 A | 12/1983 |
| JP | Hei 9-40008 A | 2/1997 |
| JP | 2000-103088 A | 4/2000 |
| JP | 2010-142966 A | 7/2010 |
| JP | 2011 201316 A | 10/2011 |
| JP | 2012179872 A | 9/2012 |
| JP | 2013 001755 A | 1/2013 |
| JP | 2013-82885 A | 5/2013 |
| JP | 2014-214160 A | 11/2014 |
| JP | 2014-233887 A | 12/2014 |
| KR | 20090132272 A | 12/2009 |
| WO | 2013/008691 A1 | 1/2013 |

* cited by examiner

INKJET PRINTING-LAMINATION INLINE SYSTEM AND METHOD

TECHNICAL FIELD

The present invention relates to an inkjet printing-lamination inline system and method for subjecting a web-shaped base material to inkjet printing with an aqueous ink and subjecting the printed web-shaped base material to lamination.

BACKGROUND ART

Hitherto, there has been performed an operation of subjecting web-shaped base material, for example, a plastic film to inkjet printing with an aqueous ink by an inkjet printer (Patent Document 1).

Further, when such web-shaped base material is used in packages for articles and food, the web-shaped base material subjected to lamination is generally used (Patent Document 2).

In the related art, only printing is performed on a printing line for subjecting a web-shaped base material to printing by a printing machine, and only lamination is performed on a lamination line for subjecting the web-shaped base material to lamination. Therefore, at the time of manufacturing a package, it is required to transfer the package from one manufacturing line to another manufacturing line.

In recent years, various limited items, such as area-limited items and time-limited items, have come to be sold in many cases, and it is required to manufacture packages having various kinds of package designs in small quantity. In manufacturing of packages having various kinds of package designs in small quantity, when the packages are manufactured by transferring the packages from one manufacturing line to another manufacturing line and operating each of the manufacturing lines, there is a problem in that the rate of cost, such as manufacturing cost and facility cost, with respect to items increases.

Further, for printing while continuously conveying a printing base material, there may be employed a scan system and a single-pass system. Of those, the single-pass system is more suitable for high-speed printing because the single-pass system does not require scanning. A single-pass system inkjet printer is disclosed, for example, in Patent Document 3. However, when printing is performed at a printing speed of about 15 m/min, there is a problem in that ink flow and color blurring caused by insufficient drying of an ink, color mixing during multicolor printing, and the like occur, which results in a problem in that it is difficult to increase the printing speed.

PRIOR ART DOCUMENTS

Patent Documents

Patent Document 1: JP 2014-214160 A
Patent Document 2: JP Hei 9-40008 A
Patent Document 3: JP 2010-142966 A

SUMMARY OF THE INVENTION

Problems to be Solved by the Invention

The present invention has an object to provide a printing-lamination inline system and method being suitable for manufacturing packages having various kinds of package designs in small quantity and being capable of performing inkjet printing and lamination in an inline manner.

Means for Solving Problems

In order to solve the above-mentioned problem, a printing-lamination inline system of the present invention comprises a first web-shaped base material supply unit configured to supply a first web-shaped base material; an inkjet printer of a single-pass system, which is configured to subject the first web-shaped base material to aqueous inkjet printing; an adhesive application unit configured to apply an adhesive to the first web-shaped base material subjected to the aqueous inkjet printing; a second web-shaped base material supply unit configured to supply a second web-shaped base material so that the second web-shaped base material is bonded to the first web-shaped base material; a lamination unit configured to subject the first web-shaped base material and the second web-shaped base material to lamination; and an aging box configured to cause aging of a laminate film obtained by the lamination.

Suitably, the lamination is non-solvent lamination. Lamination based on a non-solvent lamination method (non-solvent type lamination method) has an advantage of being environmentally friendly because a solvent, for example, an organic solvent is not used in an adhesive. The non-solvent lamination method involves, through use of a multi-stage roll as an adhesive application unit, melting a hot-melt type adhesive by heating, thinly spreading the adhesive, applying the adhesive to a web-shaped base material, for example, a film, and press-bonding the web-shaped base material to another web-shaped base material, to thereby perform lamination. In the non-solvent lamination method, it is required to store the laminate in a heat insulating chamber kept at a temperature of, for example, from about 35° C. to about 60° C. for about one to two days to cause aging, to thereby cure the adhesive. In the printing-lamination inline system of the present invention, this aging is performed in an aging box. Therefore, the aging box in the printing-lamination inline system of the present invention has a temperature regulating function of keeping the temperature in the box at a temperature of, for example, from about 35° C. to about 60° C.

Suitably, the inkjet printer is an inkjet printer for an aqueous ink configured to form an image by ejecting an aqueous ink to the first web-shaped base material, wherein the inkjet printer comprises: a conveyance mechanism configured to continuously convey the first web-shaped base material; an inkjet head of a single-pass system, which is configured to eject, by a single-pass system, the aqueous ink to a surface of the first web-shaped base material conveyed by the conveyance mechanism; and a surface pre-heating unit, which is arranged on an upstream side of conveyance from the inkjet head, and is configured to heat at least the surface of the first web-shaped base material, and wherein the inkjet printer is configured to form the image through use of the inkjet head on the first web-shaped base material heated by the surface pre-heating unit.

Suitably, the surface pre-heating unit is configured to heat the surface of the first web-shaped base material through use of hot air blowing means for blowing hot air against the surface of the first web-shaped base material. Besides heating the first web-shaped base material by blowing hot air against the surface thereof, the first web-shaped base material can also be heated by irradiation of a laser having the same wavelength as an absorption wavelength of the first web-shaped base material. It is also conceivable to heat the first web-shaped base material by irradiation of an infrared ray. However, when the first web-shaped base material is a transparent film, an infrared ray passes therethrough without heating the first web-shaped base material. Therefore, when the first web-shaped base material is heated by irradiation of an infrared ray, the first web-shaped base material needs to have black color or needs to be a base material having a wavelength absorbing an infrared ray. A combination of heating by the hot air blowing means, heating by irradiation of a laser, and heating by irradiation of an infrared ray, which are mentioned above, can also be adopted.

For example, it is preferred that hot air at a temperature of from 40° C. to 80° C. be blown against the surface of the first web-shaped base material by the hot air blowing means.

Suitably, the hot air blowing means of the inkjet printer comprises: a nozzle group main body having a plurality of slit-shaped hot air blowing nozzles arranged so as to form gaps with one another, the plurality of slit-shaped hot air blowing nozzles each having a slit-shaped hot air outlet port extending in a width direction of the first web-shaped base material; and a suction mechanism configured to suck an atmosphere of the gaps formed in the nozzle group main body.

Suitably, the inkjet printer further comprises a back surface heating unit configured to heat a back surface of the first web-shaped base material.

Suitably, the back surface heating unit of the inkjet printer is configured to heat through use of the hot air blowing means or a hot plate. As heating by the back surface heating unit, heating by the hot air blowing means or the hot plate is suitable.

Further, heating means similar to the above-mentioned surface pre-heating unit may be arranged as a surface post-heating unit on a downstream side of conveyance of the first web-shaped base material from the inkjet head.

Suitably, the first web-shaped base material and/or the second web-shaped base material is a transparent film. As the web-shaped first substrate and/or the web-shaped second substrate of the transparent film, a film made of a transparent synthetic resin, such as polyethylene terephthalate (PET), polyvinyl chloride (PVC), and polypropylene (PP), may be suitably used.

A printing-lamination method of the present invention is a printing-lamination method using the said printing-lamination inline system, the method comprising: subjecting the first web-shaped base material to aqueous inkjet printing by the inkjet printer; applying an adhesive to the first web-shaped base material subjected to the aqueous inkjet printing by the adhesive application unit and bonding the first web-shaped base material and the second web-shaped base material to each other, to thereby perform lamination; and causing aging of a laminate film obtained by the lamination in the aging box.

Advantageous Effects of the Invention

According to the present invention, there can be attained a remarkable effect that a printing-lamination inline system and method being suitable for manufacturing packages having various kinds of package designs in small quantity can be provided.

DESCRIPTION OF EMBODIMENTS

Embodiments of the present invention are described below, but those embodiments are described as examples, and hence it is understood that various modifications may be made thereto without departing from the technical idea of the present invention. In addition, the same members are denoted by the same reference symbols.

Figure 1:
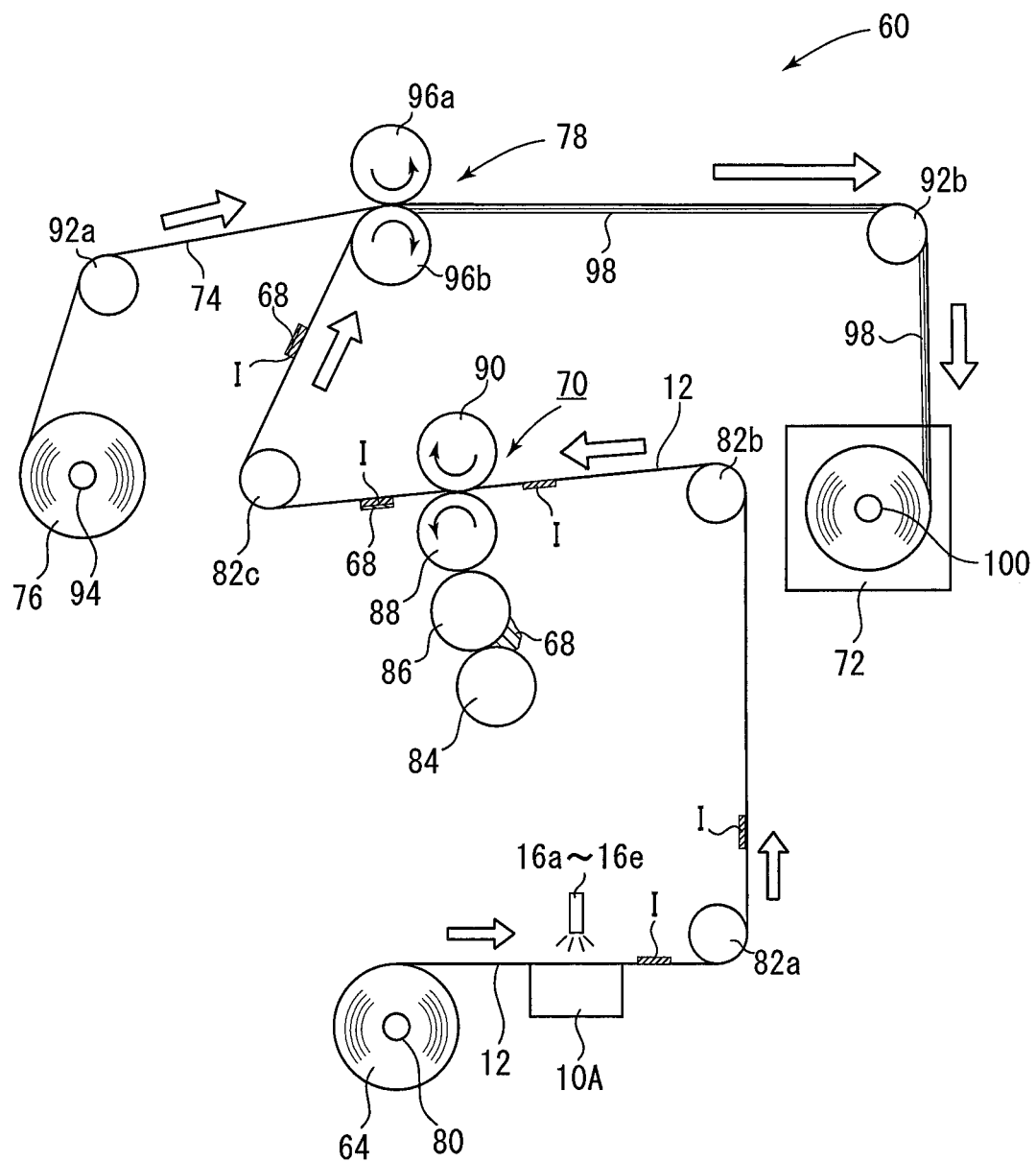
FIG. 1 is a schematic view for illustrating one embodiment of a printing-lamination inline system of the present invention.

FIG. 1 is a schematic view for illustrating one embodiment of a printing-lamination inline system of the present invention. According to the system of the present invention, inkjet printing and lamination are performed in an inline manner, that is, are integrated, and thus manufacturing can be performed on the same line.

In FIG. 1, there is illustrated a printing-lamination inline system 60 according to one embodiment of the present invention. The printing-lamination inline system 60 is a printing-lamination inline system comprising a first web-shaped base material supply unit 64, a single-pass system inkjet printer 10A, an adhesive application unit 70, a second web-shaped base material supply unit 76, a lamination unit 78, and an aging box 72. The first web-shaped base material supply unit 64 is configured to supply a first web-shaped base material 12. The single-pass system inkjet printer 10A is configured to subject the first web-shaped base material 12 to aqueous inkjet printing. The adhesive application unit 70 is configured to apply an adhesive 68 to the first web-shaped base material 12 subjected to the aqueous inkjet printing. The second web-shaped base material supply unit 76 is configured to supply a second web-shaped base material 74 so that the second web-shaped base material 74 is bonded to the first web-shaped base material 12. The lamination unit 78 is configured to subject the first web-shaped base material 12 and the second web-shaped base material 74 to lamination. The aging box 72 is configured to cause aging of a laminate film obtained by the lamination.

The first web-shaped base material supply unit 64 has the first web-shaped base material 12 wound around a winding roll 80, and the first web-shaped base material 12 is unwound to be supplied to the inkjet printer 10A. There are illustrated feed rolls 82a, 82b, and 82c.

The first web-shaped base material 12 subjected to printing with an aqueous ink I is fed to the adhesive application unit 70. The adhesive application unit 70 comprises a roll 84, a roll 86, and an application roll 88, which form a multi-stage roll, and a pressure roller 90 arranged so as to be opposed to the application roll 88. The hot-melt type adhesive 68 is melted by heating and fed to the application roll 88 through the roll 84 and the roll 86 to be thinly applied to a printing surface of the first web-shaped base material 12 passing through between the pressure roller 90.

The first web-shaped base material 12 having the adhesive 68 applied thereto is bonded to the second web-shaped base material 74 supplied from the second web-shaped base material supply unit 76 by the lamination unit 78 to be subjected to lamination. The second web-shaped base material supply unit 76 has the second web-shaped base material 74 wound around a winding roll 94, and the second web-shaped base material 74 is unwound to be supplied to the lamination unit 78 in which press rolls 96a and 96b are arranged. The press roll 96a is a heating metal roll, and the press roll 96b is a rubber roll. There are illustrated feed rollers 92a and 92b.

As described above, lamination is performed to manufacture a laminate film 98. The laminate film 98 is wound around and taken up by a winding roll 100. The winding roll 100 is set in the aging box 72, and the inside of the aging box 72 is kept at a temperature of, for example, from about 35° C. to about 60° C. by the temperature regulating function. Then, the manufactured laminate film 98 is stored in the aging box 72 for, for example, about one to two days to cause aging. In such a manner, a printing-lamination method using the printing-lamination inline system of the present invention is performed.

Next, embodiments of an inkjet printer to be used in the printing-lamination inline system of the present invention are described with reference to FIG. 2 to FIG. 6.

Figure 2:
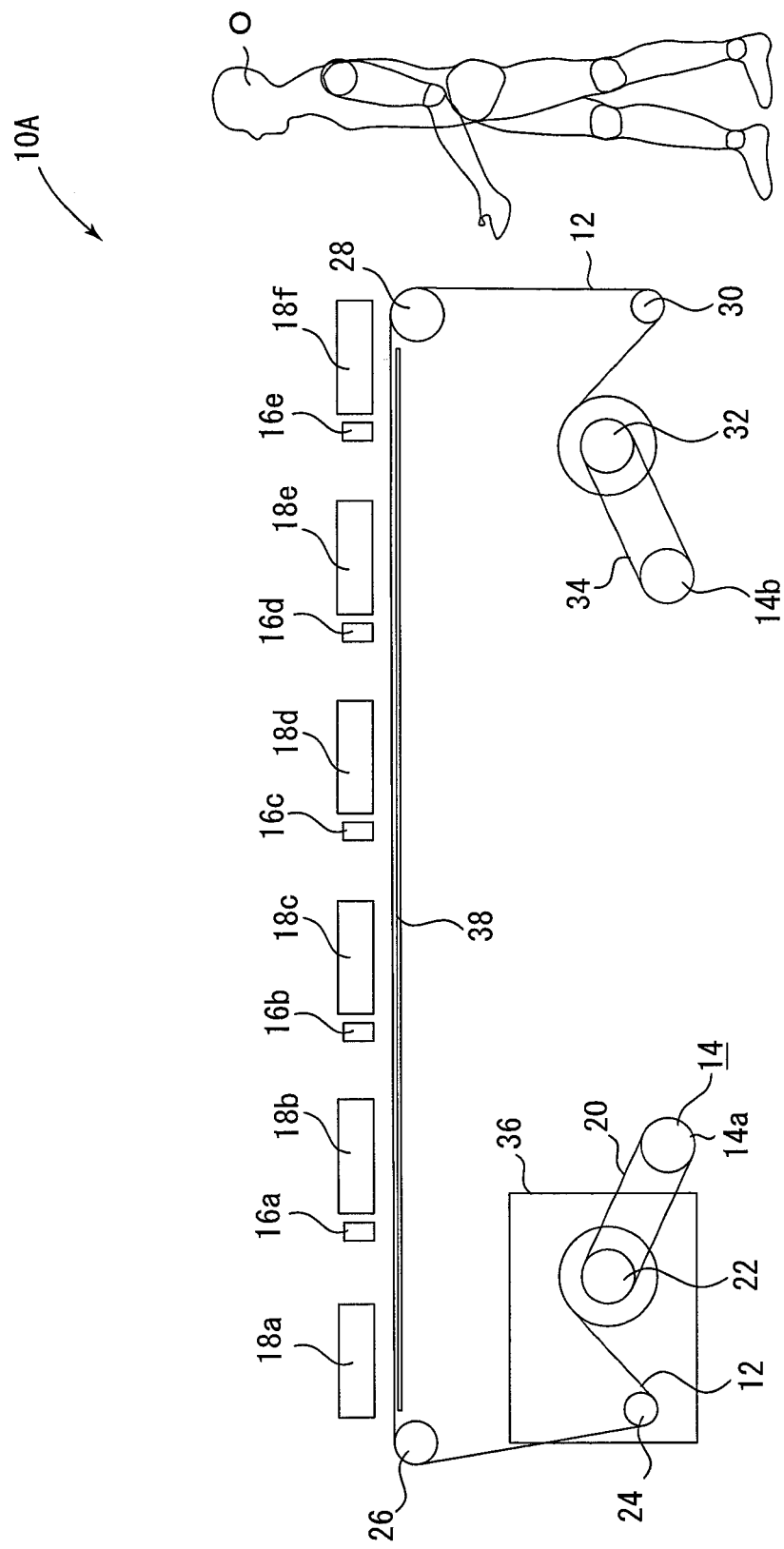
FIG. 2 is a sectional structural view for illustrating one embodiment of an inkjet printer to be used in the printing-lamination inline system of the present invention.

FIG. 2 is a sectional structural view for illustrating one embodiment of the inkjet printer to be used in the printing-lamination inline system of the present invention.

In FIG. 2, an inkjet printer 10A is an inkjet printer for an aqueous ink configured to form an image by ejecting an aqueous ink to the first web-shaped base material 12. The inkjet printer 10A comprises a conveyance mechanism 14 (conveyance mechanisms 14a and 14b in the illustrated example), inkjet heads 16a to 16e of a single-pass system, and surface pre-heating units 18a to 18e. The conveyance mechanism 14 is configured to continuously convey the first web-shaped base material 12. The inkjet heads 16a to 16e are configured to eject, by a single-pass system, an aqueous ink to a surface of the first web-shaped base material 12 conveyed by the conveyance mechanism 14. The surface pre-heating units 18a to 18e are arranged on an upstream side of conveyance from the inkjet heads 16a to 16e, and are configured to heat at least the surface of the first web-shaped base material 12. Ink ejection by the inkjet heads 16a to 16e is performed with respect to the first web-shaped base material 12 heated by the surface pre-heating units 18a to 18e. Surface post-heating units 18b to 18f are arranged on a downstream side of conveyance from the inkjet heads 16a to 16e so that drying of the aqueous ink ejected by the inkjet heads 16a to 16e is further accelerated.

The surface pre-heating units 18b to 18e also serve as surface post-heating units and hence also function as the surface post-heating units 18b to 18e.

As the inkjet heads 16a to 16e, various known inkjet ejection devices of the single-pass system can be adopted.

Also as the conveyance mechanism 14, any known mechanism capable of conveying the first web-shaped base material 12 may be adopted. As illustrated in FIG. 2, it is possible to adopt a configuration comprising drive belts 20 and 34, an original roller 22 having the first web-shaped base material 12 wound therearound, various rollers 24, 26, 28, and 30 configured to convey the first web-shaped base material 12, and a take-up roller 32 configured to take up the printed first web-shaped base material 12. There is illustrated an operator O who operates the inkjet printer.

The original roller 22 having the first web-shaped base material 12 wound therearound is placed in a heating box 36 and is heated in advance (pre-heated) to a temperature of from 60° C. to 70° C. The original roller 22 may be heated in the heating box 36 with hot air or various known heaters. In the illustrated example, the inside of the heating box 36 is heated with hot air.

The first web-shaped base material 12 heated in advance as described above has at least the surface thereof heated by the surface pre-heating units 18a to 18e arranged on the upstream side of conveyance from the inkjet heads 16a to 16e. As the surface pre-heating units 18a to 18e, the hot air blowing means is exemplified. In the hot air blowing means, hot air at a temperature of from about 40° C. to about 80° C., for example, 70° C. is blown against the surface of the first web-shaped base material 12. A time period for blowing hot air is from about 2 seconds to about 3 seconds when a printing speed is 15 m/min, but is appropriately changed also depending on the temperature of the hot air.

Figure 3:
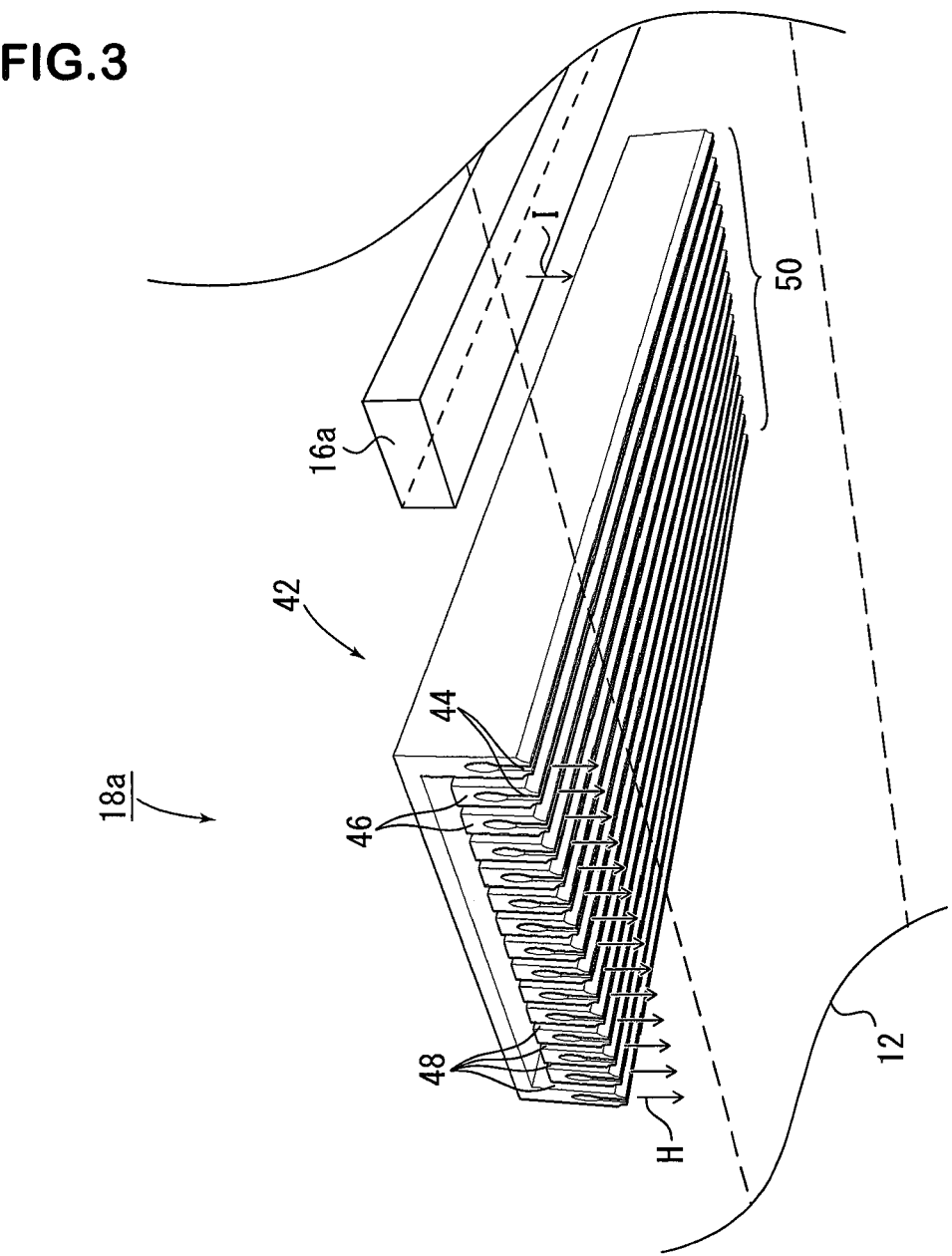
FIG. 3 is a perspective view for illustrating one embodiment of hot air blowing means to be used in the inkjet printer for use in the printing-lamination inline system of the present invention.

The hot air blowing means in the embodiment to be used as the surface pre-heating units 18a to 18e is illustrated in FIG. 3. As is well illustrated in FIG. 3, as hot air blowing means 42 serving as the surface pre-heating unit 18a, it is possible to adopt a configuration comprising a nozzle group main body 50 and a suction mechanism (not shown). The nozzle group main body 50 has a plurality of slit-shaped hot air blowing nozzles 46 arranged so as to form gaps 48 with one another. The plurality of slit-shaped hot air blowing nozzles 46 each have a slit-shaped hot air outlet port 44 extending in a width direction of the first web-shaped base material 12. The suction mechanism is configured to suck an atmosphere of the gaps 48 formed in the nozzle group main body 50. The atmosphere of the gaps 48 is sucked in a direction opposite to blowing of hot air H (in a direction opposite to the arrows of FIG. 3) by the suction mechanism (not shown). As such suction mechanism, various known suction devices can be used, and hence illustration thereof is omitted. Thus, the effect of reducing color blurring and the like caused by an aqueous ink is attained by sucking the atmosphere of the gaps 48.

Figure 4:
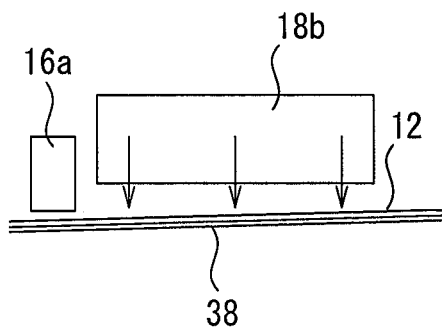
FIG. 4 is an enlarged view of a main portion of FIG. 2.

Further, in the example of FIG. 2, as is well illustrated in FIG. 4, there is illustrated an example in which hot air blowing means similar to the hot air blowing means serving as the above-mentioned surface pre-heating unit 18a is used also as the surface post-heating unit 18b and arranged on the downstream side of conveyance from the inkjet head 16a. As is well illustrated in FIG. 2 and FIG. 3, the inkjet heads 16a to 16e are inkjet heads each having an ink storage tank (not shown) of cyan (C), magenta (M), yellow (Y), black (B), or white (W), and the aqueous ink I of each color is ejected from each of the inkjet heads 16a to 16e.

Further, in the example of FIG. 2, there is illustrated an example in which a back surface heating unit 38 configured to heat the first web-shaped base material 12 from a back surface thereof is arranged. As the back surface heating unit 38, a known hot plate can be used. For example, an electrothermal heater having a filament laid on a ceramic plate can be used. When the hot plate is used as the back surface heating unit 38, the hot plate is suitably used after being heated to a temperature of, for example, from 40° C. to 65° C. It is only required that the back surface heating unit 38 be arranged so as to correspond to the inkjet heads 16a to 16e. Thus, the back surface heating unit 38 may be arranged across set positions of the inkjet heads 16a to 16e as illustrated in FIG. 2, or can also be arranged in accordance with set positions of the inkjet heads 16a to 16e.

Further, as the back surface heating unit 38, the hot air blowing means similar to the surface pre-heating unit 18a can also be used. Further, when the hot air blowing means is used as the back surface heating unit 38, for example, hot air at a temperature of from 40° C. to 80° C. is suitably blown against the back surface of the first web-shaped base material 12.

Figure 5:
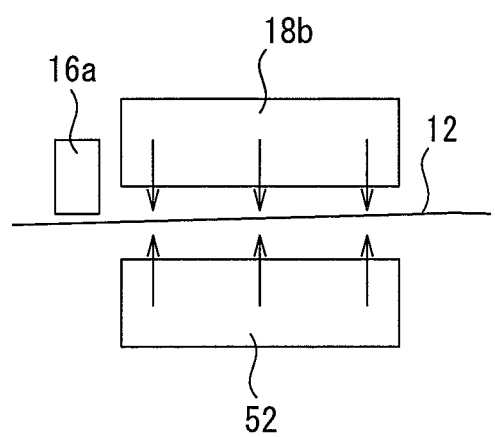
FIG. 5 is an enlarged view for illustrating a main portion of another embodiment of an inkjet printer to be used in the printing-lamination inline system of the present invention.

In FIG. 5, there is illustrated an example in which the hot air blowing means is used as the back surface heating unit 38. In FIG. 5, there is illustrated hot air blowing means 52 serving as the back surface heating unit 38. The configuration is the same as the above-mentioned configuration except that the hot air blowing means 52 is arranged as the back surface heating unit 38.

Figure 6:
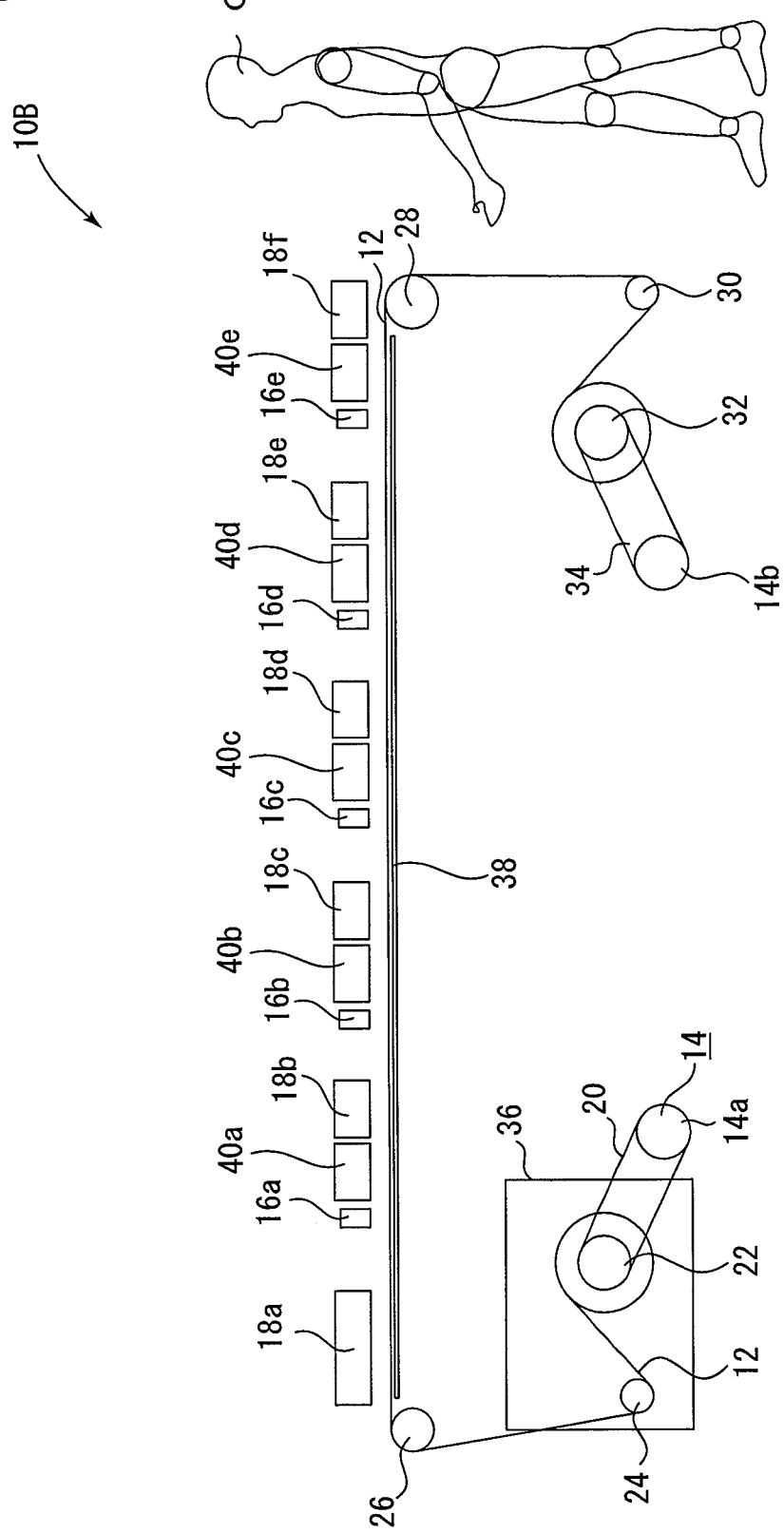
FIG. 6 is an enlarged view for illustrating a main portion of still another embodiment of an inkjet printer to be used in the printing-lamination inline system of the present invention.

Next, another embodiment of an inkjet printer to be used in the printing-lamination inline system of the present invention is illustrated in FIG. 6.

In FIG. 6, there is illustrated another embodiment of an inkjet printer 10B to be used in the printing-lamination inline system of the present invention. In the inkjet printer 10B, as additional surface post-heating units, laser irradiation devices 40a to 40e are arranged on the downstream side of conveyance from the inkjet heads 16a to 16e. The configuration of the inkjet printer 10B is the same as that of the inkjet printer 10A described above except that the laser irradiation devices 40a to 40e are arranged.

With the inkjet printers 10A and 10B having the configurations as described above, when ink ejection by the inkjet heads 16a to 16e is performed through use of an aqueous ink with respect to the first web-shaped base material 12 heated by the surface pre-heating units 18a to 18e of the inkjet printers 10A and 10B, printing can be suitably performed with respect to a transparent PET film as the first web-shaped base material without ink flow and color blurring, color mixing during multicolor printing, and the like even at a printing speed of 15 m/min. Further, as illustrated in the inkjet printers 10A and 10B, when the surface post-heating units and the back surface heating unit are combined, ink flow and ink blurring, color mixing during multicolor printing, and the like are further eliminated, and printing can be suitably performed.

REFERENCE SIGNS LIST 10A, 10B: inkjet printer, 12: first web-shaped base material, 14, 14a, 14b: conveyance mechanism, 16a to 16e: inkjet head of single-pass system, 18a to 18e: surface pre-heating unit, 18b to 18f: surface post-heating unit, 20, 34: drive belt, 22: original roller, 24, 26, 28, 30: roller, 32: take-up roller, 36: heating box, 38: heating unit, 40a to 40e: laser irradiation device, 42, 52: hot air blowing means, 44: slit-shaped hot air outlet port, 46: slit-shaped hot air blowing nozzle, 48: gap, 50: nozzle group main body, 60: printing-lamination inline system, 64: first web-shaped base material supply unit, 68: adhesive, 70: adhesive application unit, 72: aging box, 74: second web-shaped base material, 76: second web-shaped base material supply unit, 78: lamination unit, 80, 94, 100: winding roll, 82a, 82b: feed roll, 84, 86: roll, 88: application roll, 90: pressure roller, 92a, 92b: feed roll, 96a, 96b: press roll, 98: laminate film, H: hot air, I: aqueous ink, O: operator.

The invention claimed is:

1. A printing-lamination inline system, comprising:
a first web-shaped base material supply unit configured to supply a first web-shaped base material;
an inkjet printer of a single-pass system configured to subject the first web-shaped base material to aqueous inkjet printing;
an adhesive application unit configured to apply an adhesive to the first web-shaped base material subjected to the aqueous inkjet printing;
a second web-shaped base material supply unit configured to supply a second web-shaped base material so that the second web-shaped base material is bonded to the first web-shaped base material;
a lamination unit configured to subject the first web-shaped base material and the second web-shaped base material to lamination; and
an aging box configured to cause aging of a laminate film obtained by the lamination, the aging box having only a single opening, wherein the inkjet printer is an inkjet printer for an aqueous ink configured to form an image by ejecting an aqueous ink to the first web-shaped base material, the aging box having a first wall, a second wall, a third wall and a fourth wall, the first wall, the second wall, the third wall and the fourth wall defining an heated interior space, the laminate film being stored in the heated interior space, wherein the inkjet printer comprises:
a conveyance mechanism configured to continuously convey the first web-shaped base material;
an inkjet head of single-pass system configured to eject, by a single-pass system, the aqueous ink to a surface of the first web-shaped base material conveyed by the conveyance mechanism; and
a surface pre-heating unit arranged on an upstream side of conveyance from the inkjet head, and the surface pre-heating unit is configured to heat at least the surface of the first web-shaped base material, wherein the inkjet printer is configured to form the image via the inkjet head on the first web-shaped base material heated by the surface pre-heating unit, wherein the surface pre-heating unit of the inkjet printer is configured to heat via a hot air blowing means for blowing hot air against the surface of the first web-shaped base material, the first wall comprising the single opening, each of the second wall, the third wall and the fourth wall extending continuously, without interruption, from one end thereof to another end thereof, wherein the hot air blowing means of the inkjet printer comprises:
a nozzle group main body having a plurality of slit-shaped hot air blowing nozzles arranged so as to form gaps with one another, each of the plurality of slit-shaped hot air blowing nozzles having a slit-shaped hot air outlet port extending in a width direction of the first web-shaped base material; and
a suction mechanism configured to suck an atmosphere of the gaps formed in the nozzle group main body.

2. A printing-lamination inline system according to claim 1, wherein the lamination is non-solvent lamination.

3. A printing-lamination inline system according to claim 1, wherein the inkjet printer further comprises a back surface heating unit configured to heat a back surface of the first web-shaped base material.

4. A printing-lamination inline system according to claim 3, wherein the back surface heating unit of the inkjet printer is configured to heat the back surface of the first web-shaped base material via a hot air blowing means or a hot plate.

5. A printing-lamination inline system according to claim 1, wherein at least one of the first web-shaped base material and the second web-shaped base material is a transparent film.

6. A printing-lamination method, comprising:
providing a printing-lamination inline system comprising:
a first web-shaped base material supply unit configured to supply a first web-shaped base material;
an inkjet printer of a single-pass system configured to subject the first web-shaped base material to aqueous inkjet printing;
an adhesive application unit configured to apply an adhesive to the first web-shaped base material subjected to the aqueous inkjet printing;
a second web-shaped base material supply unit configured to supply a second web-shaped base material so that the second web-shaped base material is bonded to the first web-shaped base material;
a lamination unit configured to subject the first web-shaped base material and the second web-shaped base material to lamination; and
an aging box configured to cause aging of a laminate film obtained by the lamination, the aging box having only a single opening;
subjecting the first web-shaped base material to aqueous inkjet printing by the inkjet printer;
applying an adhesive to the first web-shaped base material subjected to the aqueous inkjet printing by the adhesive application unit and bonding the first web-shaped base material and the second web-shaped base material to each other, to thereby perform lamination; and
causing aging of a laminate film obtained by the lamination in the aging box, wherein the inkjet printer is an inkjet printer for an aqueous ink configured to form an image by ejecting an aqueous ink to the first web-shaped base material, the aging box comprising four walls, the four walls defining a heated interior space, the laminate film being stored in the heated interior space, wherein the inkjet printer comprises:
a conveyance mechanism configured to continuously convey the first web-shaped base material;
an inkjet head of single-pass system configured to eject, by a single-pass system, the aqueous ink to a surface of the first web-shaped base material conveyed by the conveyance mechanism; and
a surface pre-heating unit arranged on an upstream side of conveyance from the inkjet head, and the surface pre-heating unit is configured to heat at least the surface of the first web-shaped base material, wherein the inkjet printer is configured to form the image via the inkjet head on the first web-shaped base material heated by the surface pre-heating unit, wherein the surface pre-heating unit of the inkjet printer is configured to heat via a hot air blowing means for blowing hot air against the surface of the first web-shaped base material, wherein three of the four walls extend continuously, without interruption, from one end thereof to another end thereof and only one of the four walls comprises the single opening, wherein the hot air blowing means of the inkjet printer comprises:
a nozzle group main body having a plurality of slit-shaped hot air blowing nozzles arranged so as to form gaps with one another, each of the plurality of slit-shaped hot air blowing nozzles having a slit-shaped hot air outlet port extending in a width direction of the first web-shaped base material; and
a suction mechanism configured to suck an atmosphere of the gaps formed in the nozzle group main body.

7. A printing-lamination method according to claim 6, wherein the lamination is non-solvent lamination.

8. A printing-lamination method according to claim 6, wherein the inkjet printer further comprises a back surface heating unit configured to heat a back surface of the first web-shaped base material.

9. A printing-lamination method according to claim 8, wherein the back surface heating unit of the inkjet printer is configured to heat the back surface of the first web-shaped base material via one of a hot air blowing means and a hot plate.

10. A printing-lamination method according to claim 6, wherein at least one of the first web-shaped base material and the second web-shaped base material is a transparent film, wherein the laminate film enters from one side of the aging box via the single opening into an interior space of the aging box without the laminate film exiting another side of the aging box.

11. A printing-lamination inline system, comprising:
a first web-shaped base material supply unit configured to supply a first web-shaped base material;
an inkjet printer of a single-pass system configured to subject the first web-shaped base material to aqueous inkjet printing;
an adhesive application unit configured to apply an adhesive to the first web-shaped base material subjected to the aqueous inkjet printing;
a second web-shaped base material supply unit configured to supply a second web-shaped base material so that the second web-shaped base material is bonded to the first web-shaped base material;
a lamination unit configured to subject the first web-shaped base material and the second web-shaped base material to lamination;
an aging box configured to cause aging of a laminate film obtained by the lamination; and
a hot air blowing means for blowing hot air against the first web-shaped base material, wherein the hot air blowing means of the inkjet printer comprises:
a nozzle group main body having a plurality of slit-shaped hot air blowing nozzles arranged so as to form gaps with one another, each of the plurality of slit-shaped hot air blowing nozzles having a slit-shaped hot air outlet port extending in a width direction of the first web-shaped base material; and
a suction mechanism configured to suck an atmosphere of the gaps formed in the nozzle group main body.

12. A printing-lamination method, comprising:
providing a printing-lamination inline system comprising:
a first web-shaped base material supply unit configured to supply a first web-shaped base material;
an inkjet printer of a single-pass system configured to subject the first web-shaped base material to aqueous inkjet printing;
an adhesive application unit configured to apply an adhesive to the first web-shaped base material subjected to the aqueous inkjet printing;
a second web-shaped base material supply unit configured to supply a second web-shaped base material so that the second web-shaped base material is bonded to the first web-shaped base material;
a lamination unit configured to subject the first web-shaped base material and the second web-shaped base material to lamination; and an aging box configured to cause aging of a laminate film obtained by the lamination;

a hot air blowing means for blowing hot air against the first web-shaped base material, wherein the hot air blowing means of the inkjet printer comprises:

a nozzle group main body having a plurality of slit-shaped hot air blowing nozzles arranged so as to form gaps with one another, each of the plurality of slit-shaped hot air blowing nozzles having a slit-shaped hot air outlet port extending in a width direction of the first web-shaped base material; and a suction mechanism configured to suck an atmosphere of the gaps formed in the nozzle group main body subjecting the first web-shaped base material to aqueous inkjet printing by the inkjet printer;

applying an adhesive to the first web-shaped base material subjected to the aqueous inkjet printing by the adhesive application unit and bonding the first web-shaped base material and the second web-shaped base material to each other, to thereby perform lamination; and causing aging of a laminate film obtained by the lamination in the aging box.

* * * * *